Patented July 13, 1926.

1,592,773

UNITED STATES PATENT OFFICE.

CARLETON ELLIS, OF MONTCLAIR, NEW JERSEY.

COMPLEX RESIN COMPOSITION AND PROCESS OF MAKING SAME.

No Drawing. Application filed May 18, 1923. Serial No. 639,947.

This invention relates to a resinous complex or composition and to the process of making same and relates especially to a product which is capable of being molded to yield shaped articles of utility in the field of electrical insulation and elsewhere and further relates particularly to resins or resinous compositions containing the reaction products of appropriately active phenolic bodies with a plurality of aldehydic bodies preferably having a constitution embracing two or more carbon atoms.

As appropriately active phenolic bodies, phenol and cresols, particularly meta or paracresol may be employed. Phenol itself is perhaps best suited for the majority of purposes involving hot pressing and in the illustrative procedure which follows it will be noted that I have availed of phenol to exemplify the invention. On the other hand when a slowly reacting resinous composition is required, for example for cold molding, orthocresol and higher phenolic substances may be used in some cases.

As appropriate aldehydes containing two or more carbon atoms I prefer to use acetaldehyde or paraldehyde in conjunction with furfural. Paraldehyde and furfural hence are employed herein in an illustrative sense but it should be understood that acetaldehyde and its polymers may be utilized on the one hand and that in lieu of furfural on the other hand various other aldehydes such as butyl aldehyde, acrolein and the like may be substituted in some cases. Similarly such aldehydes may replace acetaldehyde for certain purposes.

The object in connection with the present invention is to form a resinous complex not possessing the qualities of the products formed from phenol and the individual aldehydes used alone. Desirable resinous qualities are conferred in part by increasing the molecular size or weight and also the molecular complexity. There is a further condition improving the truly resinous and colloidal qualities of resins which is a physical one and which may be expressed as heterogeneity of composition. By using two or more—that is a plurality—of reactive aldehydes a degree of complexity of both a physical and a chemical character is secured which lends desirable and important properties to resins intended for use in the plastic arts.

It may be noted that aldehydes containing two or more carbon atoms when reacting with phenol form bodies of a character entirely different from those obtained by the single carbon atom substance formaldehyde. The latter forms hydroxy benzyl alcohol from which resins of certain types are derived. Acetaldehyde on the contrary introduces a methyl group which may have reactive qualities bringing about linkage which could not take place otherwise. Furfural introduces the furfurane group whose reactivity is well-evidenced in the case of cumaron resin (note Ellis, Synthetic Resins and Their Plastics, 1923, pages 31 and 202). Each union of an aldehyde having more than a single carbon atom tends to produce a complexity of composition and structure not typified by a single carbon aldehyde. The desirable complexity obtained by the employment of two-carbon or polycarbon aldehydes, more particularly when two or a greater number of such aldehydes are used is a feature of the preferred form of the present invention.

Such complex resins moreover can not be readily made effectively in the manner customary with formaldehyde products. Only by proceeding along carefully defined lines can products of commerical interest be obtained.

The procedure given below is set forth in great detail but the invention is not to be construed as limited thereby. The directions are given in this explicit manner in order to provide a fully adequate working procedure.

Example. 173 pounds of phenol are melted and warmed to a temperature of about 70° C. 2 pounds of concentrated hydrochloric acid are added. 30 pounds of paraldehyde are introduced in small portions, approximately 2 pounds at a time, over a period of one-half hour. This operation may take place in a closed enamelled tank equipped with a water-cooled reflux condenser. The temperature increases due to the heat of reaction to about 100–102° C., more or less depending on room temperature.

The reaction mixture is heated to 150° C., the application of heat being gradual and requiring from 2 to 2½ hours. Then the batch is cooled to 125° C. and 11 pounds of potassium carbonate are added in small portions with stirring. Foaming occurs which is minimized by proper stirring.

64 pounds of furfural are added in quantities of 10 or 15 pounds at a time. An exothermic reaction occurs and in due course heat may be applied externally, gradually running the temperature up to 150° C. over a period of about 3 hours.

The amounts given in this example correspond to about 1 mol. of acetaldehyde (simple formula), to 1 mol. of furfural and to about two and three quarters mols. of phenol.

In order to prepare a resin which is adapted for commercial molding requirements an important test at this stage is to determine whether combination has gone on to a satisfactory degree of completion. If phenol is present in the free state and the resinous composition is molded in steel molds, staining of the highly polished surface of the mold may occur and this is objectionable. The finish of the molded article depends on maintaining the surface of the steel mold in a highly polished state. Staining mars this and eventually results in detroying the surface finish of the molded article. The end of the reaction may be determined by pouring out a small sample and allowing it to cool rapidly to room temperature. A fragment of the resin should crumble to a powder under such pressure as can be applied between the fingers, and the powder should not exhibit tackiness. This test should be applied immediately after the resin is made and before it has been allowed to stand about for any great length of time. The softening point of the product is about 65° C. and the melting point around 85° C. It is a reddish-brown brittle material soluble in alcohol. By carrying the reaction to this stage a molding composition may be prepared which does not stain the mold, that is it is stainless.

When the reaction has reached this point it may be checked by the addition of alcohol. Ordinary denatured alcohol may be employed, especially formulas 2 or 6 (U. S. internal revenue). The addition of 3 gallons of alcohol gradually will reduce the temperature to about 100° and then the alcohol may be added in quantities of 7 or 8 gallons at a time with stirring to form a good solution containing about 50 per cent of resin.

If desired a small amount of a fatty acid mold lubricant such as commercial stearic acid 1.2 pounds may be mixed with the hot resin solution.

The following procedure will indicate details of preparing a special molding compositon from the foregoing resin. The solution is run into a mixer of the Werner-Pfleiderer type and not to exceed 36 pounds of hexamethylenetetramine are added. Although the latter compound is not readily soluble in alcohol it will dissolve in the presence of the resin. Agitation of about 1 hour serves to make a satisfactory solution.

Without coloring matter but using a wood flour filler the natural color of the molded product is a reddish-brown. To make a black composition 4.6 pounds of nigrosine may be added while the hexamethylenetetramine is dissolving.

Wood flour approximately equal in weight to the resin or say 250 pounds of the filler is admixed with the above solution for a period of about 1 hour.

After thorough incorporation the mixture is allowed to dry in the air or in a shelf dryer or preferably in a vacuum dryer at 28 inches vacuum gauge until the temperature of the powder reaches 80° C. It is held at this temperature for one-half hour.

The dried material then preferably is ground with a material which reduces or eliminates the tendency of the composition to stick to the mold. Aluminum palmitate, zinc stearate and the like may be employed. In the present example 7½ pounds of aluminum palmitate are added to the dried composition and ground in a ball mill for about 2 hours.

The resinous material and the filler also may be incorporated on mixing rolls such as are used in the milling of rubber which avoids the use of a solvent, drying and solvent recovery.

Various fillers other than wood flour may be employed such as cotton or silk flock, asbestos fibre or powder and various mineral powders such as china clay, talc, whiting and the like. Also mineral pigments. When the composition is to be used for cold molding the addition of hexamethylenetetramine is unnecessary and even undesirable.

From the foregoing it will be noted that the invention is especially concerned with the production of a complex resin prepared from an appropriately reactive phenol and a plurality of aldehydes each preferably containing two or more carbon atoms in their chemical structure. Thus acetaldehyde and furfural may be employed or acetaldehyde, butyl aldehyde and furfural or other complex reaction mixtures may be utilized; the reaction being carried out simultaneously or in stages depending on the specific catalyst required to complete the reaction for any given aldehyde.

While in some cases as for example for certain cold molding operations resins may be used which are made from phenol and each aldehyde separately and then mixed, such a mechanical mixture of the individual resins does not represent the type of resin exemplified by the preferred form of the invention which involves reaction in or on the same mass of the several (two or more) aldehydes either simultaneously or successively. Simultaneous reaction can be carried out when a catalyzer having a catalytic effect in common is available and successively when no common catalyst can be used. Thus acetaldehyde or paraldehyde require an acid catalyst for combination with phenol at atmospheric pressure while furfural calls for an alkaline catalyst to yield a resin of the most advantageous properties. These reactions therefore cannot be carried out simultaneously at atmospheric pressure to advantage and although in an autoclave under high pressures reaction may be brought about with an appropriate common catalyst the present preferred procedure involves execution with simple inexpensive apparatus calling for working at atmospheric pressures.

Another feature of the invention from the standpoint of a molding composition is that of carrying on the reaction to reduce free phenol to a minimum or preferably to eliminate it entirely. The presence of phenol in substantial quantity is frequently objectionable in molding as indicated owing to the staining action on the mold. By carrying the reaction to substantial completion, or to a point below that at which the effect of phenol is negligible staining is avoided. As indicated a resin made according to the precise formula above preferably should be allowed to react to a stage where it is brittle, immediately a sample is withdrawn and allowed to cool. When cold the resin should be capable of being readily crushed by such pressure as can be readily exerted between the fingers to make a non-sticky powder. On the other hand when the resin is to be used for impregnation purposes it should be soluble in some solvent, e. g. alcohol and reaction therefore should not be carried to the stage of insolubility.

By arresting the reaction when a quickly-cooled sample rubs to a powder which does not stick to the fingers and in fact is free from tackiness an alcohol-soluble product is obtainable yielding a stainless composition when incorporated with the ingredients aforesaid.

Ammonia compounds containing the methylene group other than hexamethylenetetramine may be used with the latter or to substitute in part or wholly for the latter.

During the manufacture of the resin it is advisable to vent the apparatus from time to time to permit of the escape of any moisture or volatile material not desired in the resin. This may take place conveniently during the periods when the resinous material is being heated up to 150° C. According to the particular method described in the illustrative example this temperature is reached twice during the operation and somewhat below or about this temperature or earlier if desired venting may be performed.

Resinous compositions or solutions prepared according to the foregoing method may be employed for impregnating sheets of paper which when superposed and subjected to pressure in a hot press can be consolidated into pressboard which may be used for electrical insulating purposes.

The present case is in part a continuation of matter disclosed in my copending case No. 587,580 filed September 11, 1922, in which I have claimed the resin complex described herein.

What I claim is:—

1. In the production of molded articles the steps of carrying out the resinification of a resin complex comprising the reaction products of a phenol, acetaldeyhyde and furfural, until a resinous product is produced which when cold can be readily crushed between the fingers to a substantially non-tacky pulverulent mass and incorporating said resinous product with hexamethylenetetramine.

2. A process of making a stainless resinous composition adapted for molding purposes which comprises reacting upon a phenolic body successively in any order, with acetaldehyde and furfural; in the presence of an acid and a basic catalyst respectively, and conducting the reaction until a resinous mass is produced which can be readily crushed between the fingers to a non-tacky pulverulent mass.

3. A resinous material comprising the fusible resinous reaction products of a phenol with acetaldehyde and furfural, such resinous material when freshly made being readily crushed between the fingers to a pulverulent non-tacky mass.

4. A resinous material comprising the fusible resinous reaction products prepared in the presence of a fixed alkali, of a phenol with furfural and another reactive aldehyde containing a plurality of carbon atoms, such resinous material when freshly made and cooled being readily crushed between the fingers to a pulverulent non-tacky mass, in admixture with hexamethylenetetramine.

5. In the production of plastic material containing resinuos reaction products of furfural and a phenolic body, the step of carrying out the resinification reaction in the presence of an alkaline condensing agent and carrying the reaction up to a stage where the resinous material can be crushed between the fingers to a substantially non-tacky powder.

6. In the production of plastic material containing resinous reaction products of furfural and a phenolic body, the step of carrying out the resinification reaction in the presence of an alkaline condensing agent and carrying the reaction up to a stage where the resinous material can be crushed between the fingers to a substantially non-tacky powder and incorporating the resulting resinous material with hexamethylenetetramine as a hardening agent.

7. A moldable mixture including hexamethethylenetetramine incorporated with a resin comprising a furfural phenolic compound of such a degree of conversion that it can, when freshly made, be readily crushed by pressure between the fingers to a substantially non-tacky pulverulent mass.

CARLETON ELLIS.